United States Patent [19]

Miller

[11] Patent Number: 5,131,693
[45] Date of Patent: Jul. 21, 1992

[54] PIPE COUPLING METHOD
[75] Inventor: Robert F. Miller, Lafayette, Calif.
[73] Assignee: Pacific Roller Die Co., Inc., Hayward, Calif.
[21] Appl. No.: 684,216
[22] Filed: Apr. 12, 1991
[51] Int. Cl.[5] ............................................. F16L 23/00
[52] U.S. Cl. ..................................... 285/364; 285/903; 285/414; 285/401
[58] Field of Search .............. 285/405, 406, 414, 410, 285/903, 363, 364

[56] References Cited

U.S. PATENT DOCUMENTS

| 735,221 | 8/1903 | Dufford | 285/414 |
|---|---|---|---|
| 852,478 | 5/1907 | Voris | 285/405 |
| 2,431,633 | 11/1947 | Brown | 285/405 |
| 2,438,472 | 3/1948 | Calcott | 285/414 |
| 3,315,991 | 4/1967 | Davis | 285/903 |
| 3,836,183 | 9/1974 | Battle | 285/414 |
| 4,140,422 | 2/1979 | Crumpler, Jr. et al. | 285/401 |
| 4,222,594 | 9/1980 | Skinner | 285/401 |
| 4,613,161 | 9/1986 | Brisco | 285/414 |

FOREIGN PATENT DOCUMENTS

| 126032 | 12/1931 | Austria | 285/414 |
|---|---|---|---|
| 1114999 | 4/1956 | France | 285/405 |
| 599997 | 11/1959 | Italy | 285/414 |
| 8587 | 1/1990 | Japan | 285/903 |
| 7507218 | 12/1975 | Netherlands | 285/903 |

Primary Examiner—Eric K. Nicholson

[57] ABSTRACT

A coupling and methods for interconnecting the ends of spirally ribbed pipe are disclosed. Grooves are formed transversely across two or more ribs of the pipe and a coupling ring is secured to the end of the pipe by lugs or cleats which rotatably engage with the grooves. Contact surfaces of the lugs are angled relative to the grooves to center the coupling ring axially of the pipe. The angular relationship of the grooves and contact surfaces of the lugs draw the ring into abutting contact with the end of the pipe as they rotatably engage the grooves.

13 Claims, 2 Drawing Sheets

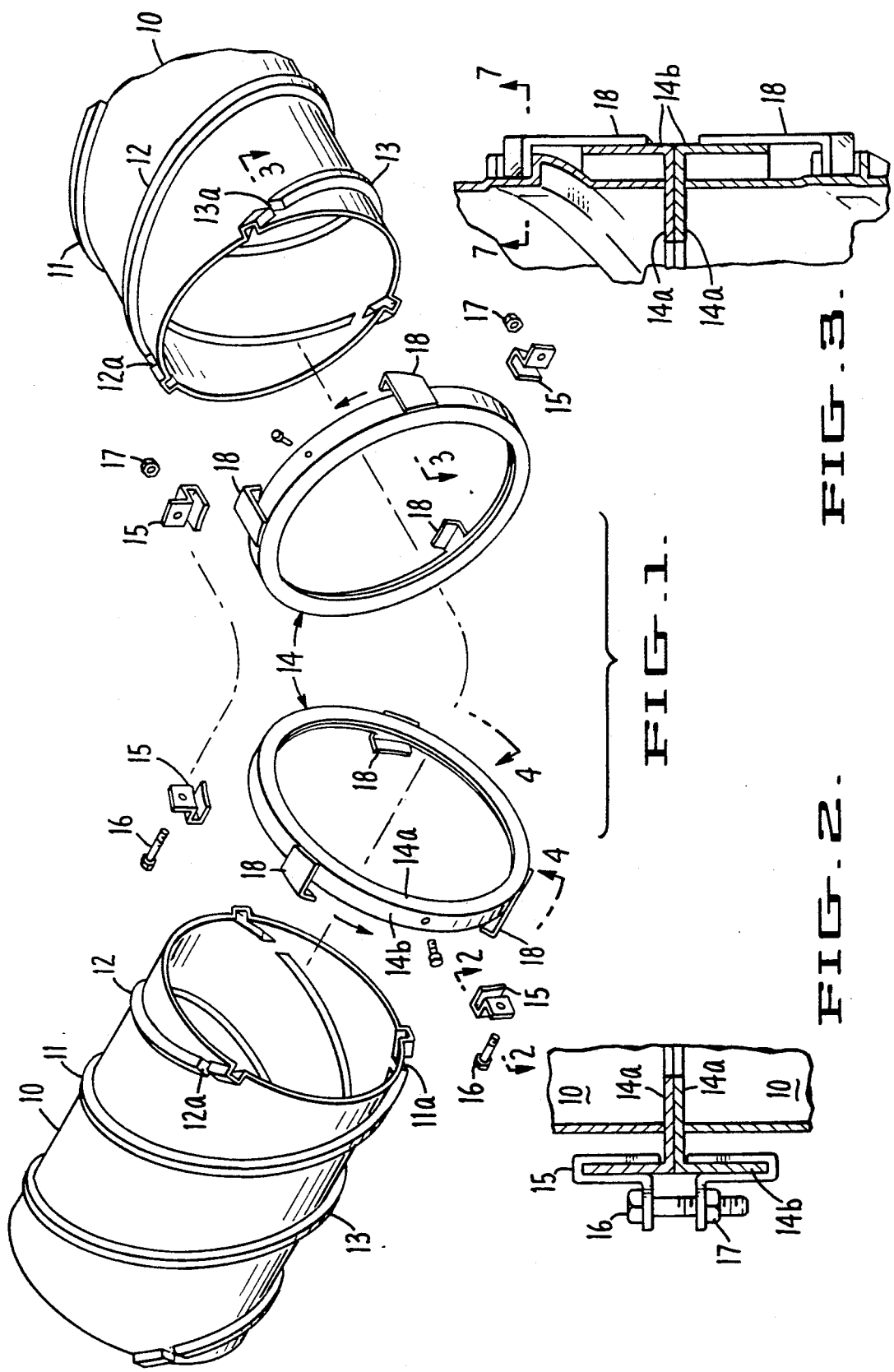

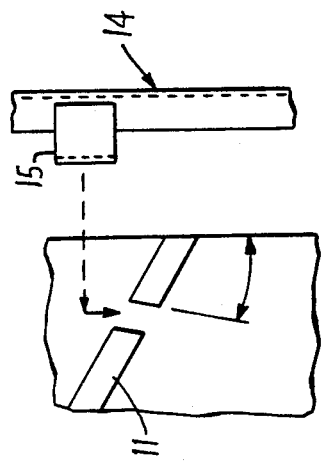
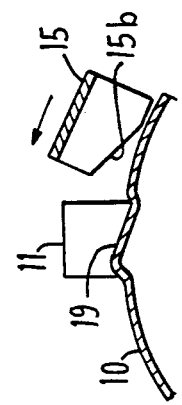
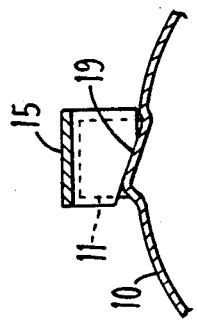
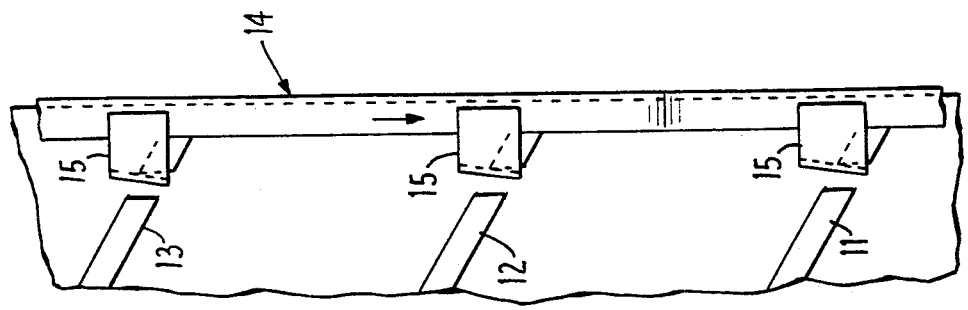
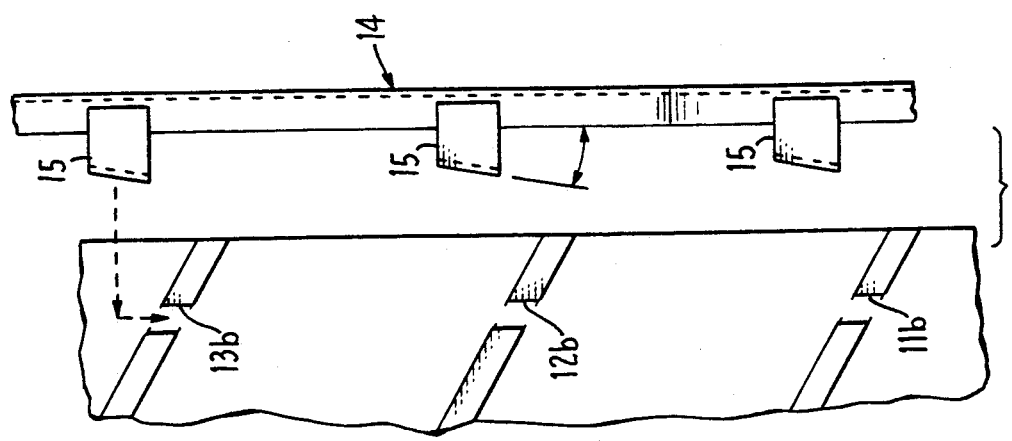

PIPE COUPLING METHOD

This invention relates generally to pipe couplings and, more specifically, to an improved coupling and method for joining the ends of two sections of spirally corrugated or ribbed pipe.

BACKGROUND OF THE INVENTION

It is customary practice in the pipe coupling art to reform the ends of spirally corrugated or ribbed pipe to provide a substantially cylindrical end portion. Thereafter, flanged collars are secured to the ends of the pipe sections, as by welding, and the flanged collars are interconnected by nuts and bolts or other fastening means.

Another coupling technique known to the art utilizes a coupling band that may be placed around the ends of two pipe sections and then clamped to each. The two ends of the pipe sections are initially prepared by recorrugating to provide substantially cylindrical surfaces and annular grooves. Corresponding annular grooves are provided in the coupling band which, when clamped around the ends of the pipe sections, improve the strength of the coupling and resist axial separations.

SUMMARY OF THE INVENTION

The present invention avoids the step of recorrugation by forming grooves that extend substantially across the ribs at the end of each pipe section. An attachment device, such as a flanged collar, is then secured to the pipe section by engaging two or more lugs or cleats, which are mounted on the flanged collar, with the grooves. The flanged collars are then longitudinally interconnected with nuts and bolts or other fastening devices. Thus, the invention obviates the need for reforming the ends of the pipe while retaining and using the existing ribs to provide a fastening surface or ridge.

A principal object of this invention is to provide an improved method and coupling for interconnecting the ends of two pipe sections formed with spiral corrugations or ribs.

Another object is to provide an improved method for interconnecting the ends of spirally ribbed pipe that is both effective and economical.

Other objects of this invention will become apparent in view of the following detailed description.

BRIEF DESCRIPTION OF THE DRAWINGS

In the drawings forming a part of this application and in which like parts are identified by like reference numerals throughout the same:

FIG. 1 is a perspective view of a preferred embodiment of the invention and illustrating two sections of spiral ribbed pipe and related attachment devices;

FIG. 2 is an enlarged detail and section of a pair of assembled coupling brackets, as shown separately in FIG. 1;

FIG. 3 is a longitudinal section through a coupling, assembled as shown by the arrows and manipulative steps indicated by the broken lines 3—3 of FIG. 1;

FIGS. 4 and 5 are developments of the pipe surfaces after grooves are formed therein and further illustrating the manner in which a coupling ring with lugs is attached to the end of a ribbed pipe;

FIG. 6 is the development of a pipe surface and illustrates an alternative arrangement of grooves and lugs for attaching a coupling ring; and FIGS. 7 and 8 are transverse sections through the grooved portion of a rib illustrating cooperative surface engagements for centering a coupling ring relative to a pipe axis.

BRIEF DESCRIPTION OF THE PREFERRED EMBODIMENT

Referring to FIG. 1, a pair of pipe sections 10, each formed with three helical ribs 11, 12 and 13, are prepared for coupling by initially forming grooves 11a, 12a and 13a near to but spaced from the end of the pipe sections. A formation of the grooves, as may be accomplished with a press or roller dies, produces ridges that may be engaged for attachment of a coupling ring 14.

As shown, coupling rings 14 comprise a ring portion 14a and an integral collar portion 14b. A set of three lugs or cleats 15 are mounted to the peripheral surface of the collar portion at equal angular distances and the lugs are adapted to be simultaneously engaged with grooves 11a, 12a and 13a as indicated in FIGS. 4, 5 and 6, and as more particularly described hereinafter.

After rings 14 are mounted to pipe sections 10, they are coupled together with U-shaped brackets 16 and nuts and bolts 17, 18.

FIGS. 4 and 5 illustrate the manner by which engaging lugs 15 are engaged with grooves 11a, 12a and 13a. As shown, each of the grooves is formed in a direction circumferentially or annularly of the pipe axis. As a result, ridged surfaces 11b, 12b and 13b are formed in the ribs that may be engaged with lugs 15 for attaching the coupling rings 14. It will be noted that lugs 15 are formed with an offset flange 15a that is received in the grooves and engaged with the ridges formed by the grooves. Each of the flanges 15a extends at an angle that produces a camming action of the lugs riding against the surfaces of ridges 11b, 12b and 13b, thereby moving ring portion 14a into abutting contact with the end of the pipe section. This action is accomplished by initially offsetting the lugs relative to the ribs, axially moving the coupling ring toward the end of the pipe section until the lugs are positioned to be received in the grooves, and then rotating the ring relative to the pipe section until the lugs are seated in the grooves.

Referring to FIG. 6, an alternate arrangement of engagement surfaces is shown which will accomplish the same action as that described in connection with FIGS. 4 and 5. In that regard, the grooves are formed at an angle, or spirally, relative to the pipe axis; and the flange portion of each lug 15 extends annularly. The cooperation of engaging surfaces is the same as described in connection with FIGS. 4 and 5. In both embodiments, the coupling ring is drawn into abutting contact with the end of the pipe section by rotating the coupling ring.

FIGS. 3, 7 and 8 illustrate the preferred embodiment and use of lugs having surface engagements which also assist in mounting the connector rings and center the rings coaxially with the pipe sections. Referring to FIGS. 7 and 8 in particular, the leading edge of each flange 15a is inclined outwardly relative to the pipe axis. Similarly, grooves 11a, 12a and 13a are so formed that they define and provide an inclined plane 19 that extends from a contact point proximate to the peripheral surface of the pipe between ribs to a contact point of greater radius. Thus, as flanges 15a engage the grooves upon rotation of the coupling ring, they are forced to follow in the direction dictated by the surfaces of the groove, thereby centering the ring coaxially with the pipe axis.

The preferred embodiment also provides screws 20 for securing the coupling rings to the ends of the pipe sections after mounting. Screws 20 effectively pin the collars to the pipe sections to prevent a reverse rotation which would disengage the lugs from the grooves.

Although a preferred embodiment of the invention has been illustrated and described, various modifications and changes may be resorted to without departing from the spirit and scope of the claims, and each of such modifications and changes is contemplated. As an example, the angular relationships which produce self-centering and pressure contact between the flanged collar and the end of the pipe sections may be produced by various angular relationships. The grooves need not be annular as shown but helically offset to receive an annular ridge formed on the cleats.

What is claimed is:

1. A coupling for interconnecting the ends of two pipe sections comprising: means forming and defining angularly spaced ridges on the exterior surface of each pipe section; first and second coupling rings, each ring having contact means thereon for engaging, respectively, the angularly spaced ridges of one pipe section by relative axial and rotational movement; each of said coupling rings having an integral collar that encircles the end of the pipe to which it is connected; said contact means being supported from and projecting radially inward of said collar; means for coaxially interconnecting said coupling rings comprising a plurality of substantially U-shaped brackets arranged and applied in pairs, each formed with an integral flange that projects from one side of the bracket, each pair of brackets being engaged with the integral collar of the coupling rings, respectively, and connector means for drawing together each pair of brackets to interconnect said coupling rings.

2. A coupling for interconnecting the ends of two pipe sections comprising: means forming and defining angularly spaced ridges on the exterior surface of each pipe section; first and second coupling rings, each ring having contact means thereon for engaging, respectively, the angularly spaced ridges of one pipe section by relative axial and rotational movement; said contact means comprising a plurality of lugs angularly spaced and substantially equidistant around each ring, and means forming and defining angularly spaced inclined planes on the exterior surface of each pipe section, said planes extending from a contact surface of approximately pipe radius to a contact surface of greater radius and located for engagement by said lugs upon rotation of the ring relative to the pipe section, whereby rotation of the coupling ring engages the lugs with the inclined planes, centering the ring coaxially with the pipe section; and means for coaxially interconnecting said coupling rings.

3. A coupling for interconnecting the ends of two pipe sections, each formed with two or more helical ribs, the end of each pipe section being formed with grooves that extend across each rib and provide ridges on the exterior surface thereof, and comprising;

(a) first and second coupling rings, each ring having contact means formed thereon and receivable in said grooves for engaging the angularly spaced ridges of one pipe section, respectively, by relative axial and rotational movement; and (b) means for coaxially interconnecting said coupling rings.

4. The coupling of claim 3, said grooves further defining angularly spaced inclined planes that extend from a contact surface of approximately pipe radius to a contact surface of greater radius and engaged by said lugs upon rotation of the ring relative to the pipe section, whereby rotation of each ring relative to the pipe section rotates the plurality of spaced lugs into engagement with said inclined planes, centering the ring coaxially on a pipe section.

5. The coupling of claim 3, said contact means comprising a plurality of lugs angularly spaced and substantially equidistant around each ring, each lug and ridge having engaging surfaces that, upon rotation of the ring relative to the pipe section, draws the ring into abutting contact with the end of a pipe section.

6. The coupling of claim 3, each of said coupling rings having an integral collar that encircles the end of the pipe to which it is connected.

7. The coupling of claim 6, said means for coaxially interconnecting said coupling rings comprising a plurality of substantially U-shaped brackets arranged and applied in pairs, each formed with an integral flange that projects from one side of the bracket, each pair of brackets being engaged with the integral collar of the coupling rings, respectively, and connector means for drawing together each pair of brackets to coaxially interconnect said coupling rings.

8. The coupling of claim 6 and further comprising means for radially pinning each collar and pipe section to prevent reverse rotation and uncoupling.

9. A coupling for interconnecting the ends of two pipe sections, each of said two pipe sections being formed with two or more helical ribs, the end of each pipe section being formed with grooves that extend across said ribs and define angularly spaced ridges on the exterior surfaces of the pipe sections; and comprising first and second coupling rings, each ring having contact means thereon for engaging respectively the angularly spaced ridges of one pipe section by relative and axial rotational movement; said ridges and contact means having engaging surfaces that, upon rotation of said rings relative to a pipe section, draw each ring into abutting contact with the end of the pipe section; and means for axially interconnecting said first and second coupling rings.

10. A coupling for interconnecting the ends of two pipe sections, each of said two pipe sections being formed with two or more helical ribs, the end of each pipe section being formed with grooves that extend across said ribs and define angularly spaced inclined planes that extend from a contact surface of approximately pipe radius to a contact surface of greater radius, and comprising first and second coupling rings, each ring having contact means thereon for engaging respectively the angularly spaced ridges of one pipe section by relative and axial rotational movement; each ring having second contact means thereon and engageable with the spaced inclined planes, respectively, said ridges and contact means having engaging surfaces that, upon rotation of said rings relative to a pipe section, draw each ring into abutting contact with the end of the pipe section; and means for axially interconnecting said first and second coupling rings.

11. A method for interconnecting the ends of two pipe sections, each section having a plurality of spirally formed corrugations or ribs:

(a) forming a groove substantially across two or more ribs of each pipe section;

(b) mounting an attachment device to each pipe section by engaging said device with the grooves formed in the end of each pipe section; then (c) axially aligning the pipe sections and longitudinally interconnecting the attachment devices of one pipe section with the attachment devices of the other pipe section.

12. The method of claim 11, said attachment devices being mounted to each pipe section by rotatably engaging surfaces of the attachment devices with the grooves formed in the end of each pipe section.

13. The method of claim 12, and securing each attachment device to prevent reverse rotation as by pinning the attachment device to the pipe section.

* * * * *